Figure 1:
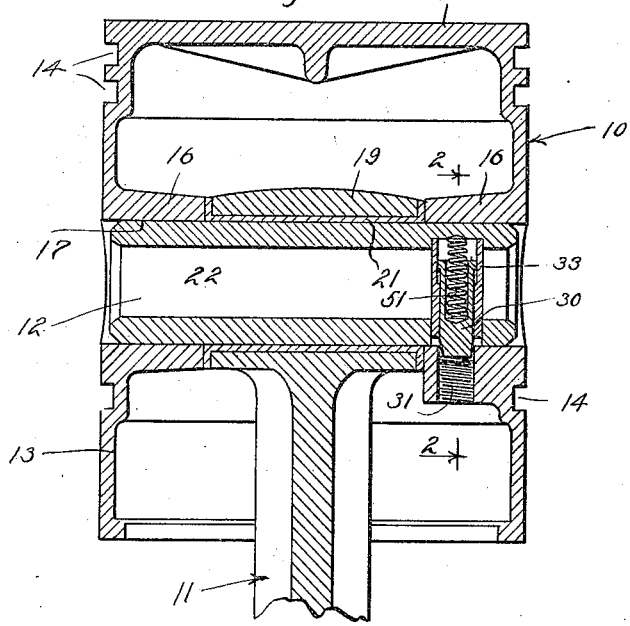

June 24, 1924.

C. R. DIEBOLD 1,499,005

DEVICE FOR SECURING PISTON PINS

Filed Nov. 11, 1922

Inventor
Charles R. Diebold
by N. H. Maxwell
his Attorney

Patented June 24, 1924.

1,499,005

UNITED STATES PATENT OFFICE.

CHARLES R. DIEBOLD, OF LOS ANGELES, CALIFORNIA.

DEVICE FOR SECURING PISTON PINS.

Application filed November 11, 1922. Serial No. 600,431.

*To all whom it may concern:*

Be it known that I, CHARLES R. DIEBOLD, a citizen of the United States, and a resident of Los Angeles, in the county of Los Angeles and State of California, have invented new and useful Improvements in Devices for Securing Piston Pins, of which the following is a full, clear, and exact disclosure.

This invention has to do with a device for securing piston pins in place, and has particular reference to that general character of device set forth in my companion application entitled piston pin securing device, filed December 27, 1921, Serial No. 525,217, and it is an object of the invention to provide a simple, effective and reliable device of this character.

In reciprocating engines, and the like, for instance, in internal combustion engines of the automobile type, pistons and connection rods are connected by piston pins rotatably carried by one part and tightly carried by the other. It is important that the piston pins be held securely in place so that they do not engage the cylinder walls to scour or injure them. In the past it has been most common to secure piston pins in place by means of set-screws, or the like, which are of course, liable to become loose.

It is an object of the present invention to provide a piston pin securing device and a manner of mounting such device in a hollow piston pin so that it is particularly secure, and does not appreciably weaken the pin.

Another object of my invention is to provide a device of the character specified, having a plunger and a spring for operating the plunger, which spring may be particularly large and strong.

Another object of my invention is to provide a device of the character specified, which is extremely simple and inexpensive of construction and which can be readily manufactured from standard material.

The various objects and features of my invention will be best and more fully understood from the following detailed description of a typical preferred form of the invention, throughout which reference is had to the accompanying drawings, while its scope will be more particularly pointed out in the appended claims.

Figure 2:
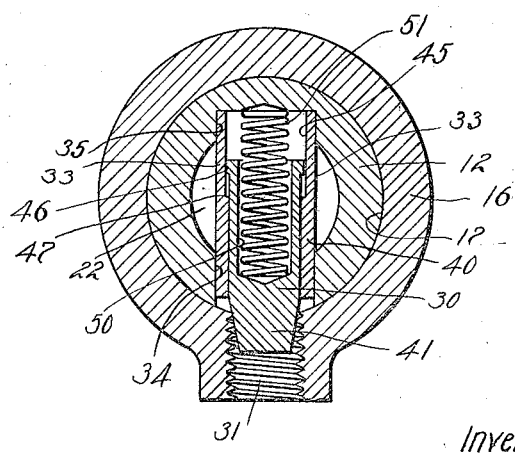

In the drawings:

Fig. 1 is a vertical detail sectional view showing a typical piston mounted on a typical connecting rod by a hollow piston pin and showing the device of the present invention in connection with the piston pin and operating to secure the piston pin in the piston: and Fig. 2 is an enlarged transverse detail sectional view taken as indicated by line 2—2 on Fig. 1.

In the drawings numerals 10 and 11, designate two parts connected by a pin 12. The part 10 is a piston adapted to reciprocate in a cylinder; and the part 11 is a connecting rod adapted to operatively connect the piston 10 with a crank shaft. The particular piston 10, illustrated in the drawings, is of the type commonly employed in automobile engines and the like, and is here set forth merely to illustrate the general character of device in connection with which the present invention may be employed. The piston 10 comprises a cylindrical body 13 formed with ring grooves 14, a head 15 at the upper end of the body 13 and bosses 16, which extend inwardly from opposite sides of the body 13, and are formed with concentric openings or bores 17, adapted to carry the ends of the piston pin 12.

The connecting rod 11 has a body part 18 at the lower end of which is a bearing (not shown) for carrying the crank pin of the crank shaft and at the upper end of which is a head 19 formed with an opening to carry the piston pin 12.

The piston pin 12 connects the connecting rod 11 and piston 10 by extending through the head 19 of the connecting rod and into the bores 17 in the bosses 16. In the particular construction illustrated in the drawings, the piston pin is rotatably or freely carried in the head 19 and is fast or tightly carried in the bores 17. The head 19 of the connecting rod carries a bushing or bearing 21 which rotatably carries the piston pin 12. The particular piston pin 12, illustrated in the drawings, is an ordinary straight hollow piston pin of the type commonly employed in automobile engines, and the like. The opening 22 through the piston pin is, of course, round and extends continuously through the pin from one end to the other.

In accordance with the present invention the piston pin 12 is secured in place in the bosses of the piston by a plunger 30. The plunger 30 is carried by the piston pin and extends into an opening 31 in one of the bosses 16. In practice the plunger 30 may be carried by the piston pin 12 so that it extends into and cooperates with the opening provided in one of the bosses 16 for the purpose of carrying a set-screw, such as is ordinarily employed for securing the piston pin. However, it will be understood that an opening 31 may be readily provided in one of the bosses 16, in the event that the piston is of a construction which does not provide such an opening.

In accordance with the present invention the plunger 30 is slidably carried in a barrel 33. For the purpose of mounting the barrel 33 in the piston pin with the plunger 30 an opening 34 is formed through one side of the piston pin and an opening or socket 35 is provided in the wall of the opening 22 at the opposite side of the pin. In practice I prefer to form the opening 34 and socket 35 by first drilling through the side of the pin to form the opening 34, and then drilling into the wall of the opening 22. In practice I find it desirable to ream the opening 34 and the socket 35 for the purpose of finishing them and getting them exactly to size. The barrel 33 may be formed of a piece of tubing, of such size that it will tightly fit into the opening 34 and socket 35. I have found it most convenient and economical to make the opening 34 and socket 35 of the same diameter and to form them in the manner hereinabove specified, and to make the exterior of the barrel 33 uniform in size throughout its length. I make the barrel so that it fits tightly into the opening 34 and socket 35 so that it has to be pressed into place and will not under any conditions of operations become displaced.

The plunger 30 has a comparatively long body part 40 slidably carried in the barrel 33 and a somewhat tapered tip 41 which projects from the outer end of the barrel 33 so that it will extend into the opening 31 in the piston boss. In accordance with the present invention the inner end portion of the barrel 33 is counter-bored at 45 and the inner end of the plunger is provided with a flange 46 which operates in the counter-bored portion of the barrel. The flange 46 is adapted to engage the shoulder 47 formed in the barrel by the counter-boring 45 to limit the amount the plunger can be moved outwardly in the barrel.

In accordance with my invention an opening 50 is formed in the body of the plunger from the inner end thereof and a compression spring 51, preferably an ordinary helical spring, is arranged between the plunger and the bottom of the socket 35. The spring 51 extends into the opening formed in the body and has one end seated in the bottom of the opening while its other end seats against the bottom of the socket 35. This construction is particularly noteworthy as it permits of a comparatively long heavy spring being employed in the device. By tapering the tip 41 of the plunger, in the manner illustrated in the drawings, it will be seated tightly in the openings 31 by the action of the spring 51.

To equip a piston pin with the device provided by the present invention the opening 34 and socket 35 are first formed in it as hereinabove specified. The plunger and spring are then arranged in connection with the barrel and the barrel forced or pressed into position in the opening and socket. The piston pin is then ready to be arranged in position to connect the piston and connecting rod. To arrange the piston pin in place to connect the piston and connecting rod the plunger 30 is depressed against the resistance of the spring 51 and is held depressed until the piston pin has been slid through the bosses and head of the connecting rod until the plunger is within the boss provided with the opening 31. The pin is then further slid through the bosses and head 19 until the plunger comes in register with the opening 31 and is forced into the opening by means of the spring 51. The tip of the plunger being tapered tightly wedges into the opening 31 and the spring 51 urges the plunger outwardly in the barrel so that the tip of the plunger is held tightly seated in the opening 31. In practice, of course, the spring is sufficiently strong to maintain the plunger in the opening 31 under all conditions of operation of the engine. To remove the piston pin it is merely necessary to retract or depress the plunger by inserting a suitable tool through the opening 31 and then drive the pin out of the bosses and head in the usual manner.

From the foregoing description and inspection of the drawings it will be seen that the present invention provides a device which is particularly effective and secure, which can be readily and easily mounted in a piston pin, particularly a hollow piston pin, without materially weakening the pin, and which operates automatically to secure the pin in place upon the pin being moved into proper position. By mounting the device in the piston pin in an opening in one part of the pin and a socket in the opposite part of the pin the pin is not materially weakened. It will be needless to point out that the barrel and plunger of the device are of such formation and construction that they can be readily and economically formed from standard materials. The barrel may be simply a straight piece of tubing counter-bored at its inner end while the plunger may be formed from a piece of rod or bar by boring it from one end and shaping its exterior with a simple shaping tool. It is to be noted that the plunger is guided throughout a considerable portion of its length by the barrel so that it is firmly carried by the barrel and is not apt to have side movement.

Having described only a typical preferred form of my invention I do not wish to limit myself to the specific details hereinabove set forth but wish to reserve to myself any changes or variations that may appear to those skilled in the art or fall within the scope of the following claims.

Having described a preferred form of my invention, I claim:

1. In combination, a piston having a transverse bore, a piston pin mounted in said bore, said piston and piston pin having aligned openings, a socket in said piston pin opposite said openings, a barrel carried by said piston pin opening and socket, and a plunger in said barrel adapted to cooperate with the opening in the piston to detachably secure the pin to the piston.

2. A device of the character described to be used in combination with a hollow piston pin having a transverse opening in one side and a socket opposite the opening and a piston carrying the pin and having an opening in register with said opening in the pin including a barrel to be tightly carried in the opening and socket in the pin, a plunger slidably carried in the barrel to cooperate with the opening in the piston to secure the pin in the piston, a spring between the plunger and the bottom of the socket to urge the plunger outwardly in the barrel, and means for limiting the outward movement of the plunger in the barrel.

3. In combination, a hollow piston pin having a transverse opening in one side and a socket opposite the opening, a piston carrying the pin and having an opening in register with said opening in the pin, a barrel tightly carried in the opening and socket in the pin, a plunger slidably carried in the barrel, to cooperate with the opening in the piston to secure the pin in the piston, the plunger having an opening extending into it from its inner end, a spring arranged between the bottom of the opening in the plunger and the bottom of the socket to urge the plunger outwardly in the barrel, and means for limiting the outward movement of the plunger in the barrel.

4. A device of the character described adapted to be employed in connection with a hollow piston pin having a transverse opening in one side and a socket in its inner wall opposite the opening and a piston having an opening including, a barrel adapted to be tightly carried in said opening and socket in the pin, a plunger slidably carried in the barrel and adapted to cooperate with the opening in the piston to secure the pin in the piston, and a compression spring adapted to be arranged between the plunger and the bottom of the socket.

5. A device of the character described adapted to be employed in connection with a hollow piston pin having a transverse opening in one side and a socket in its inner wall opposite the opening and a piston having an opening including, a barrel adapted to be tightly carried in said opening and socket in the pin, a plunger slidably carried in the barrel and adapted to cooperate with the opening in the piston to secure the pin in the piston, a compression spring adapted to be arranged between the plunger and the bottom of the socket, and means for limiting the outward movement of the plunger in the barrel.

6. A device of the character described including, a barrel counter-bored from its inner end to form a shoulder, a plunger slidably carried in the barrel and adapted to project from the outer end of the barrel, and a flange on the inner end of the plunger to cooperate with the shoulder to limit outward movement of the plunger in the barrel.

7. A device of the character described adapted to be employed in connection with a hollow piston pin having a transverse opening in one side and a socket in its inner wall opposite the opening and a piston having an opening including, a barrel adapted to be tightly carried in said opening and socket in the pin, the barrel being counter-bored from its inner end to form a shoulder, a plunger slidably carried in the barrel and adapted to cooperate with the opening in the piston to secure the pin in the piston, the plunger having an opening extending into it from its inner end, a flange on the inner end of the plunger to cooperate with the shoulder to limit outward movement of the plunger in the barrel, and a compression spring adapted to be arranged between the socket and plunger with one end seated on the bottom of the socket and the other end seated on the bottom of the opening in the plunger.

In witness that I claim the foregoing I have hereunto subscribed my name this 27 day of Oct. 1922.

CHARLES R. DIEBOLD.